Dec. 18, 1962 B. DONATH 3,069,676
METHOD OF NARROW BAND TRANSMISSION OF RADAR PANORAMA SCREEN PICTURES
Filed June 29, 1956
FIG. I
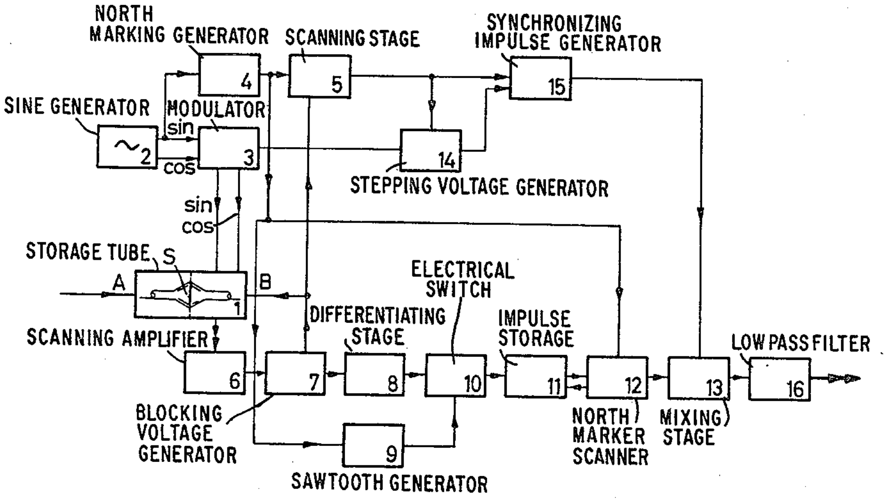
FIG. 2
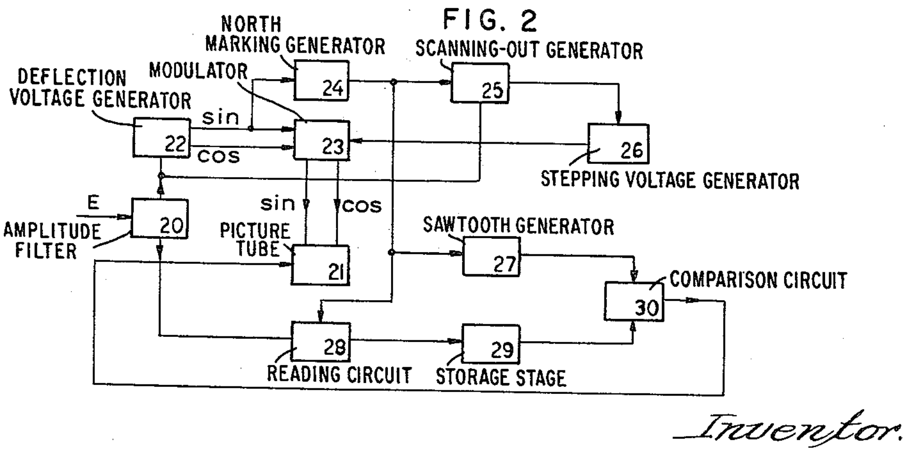
Inventor.
Bernhard Donath.
By [signature] Atty.

United States Patent Office 3,069,676

Patented Dec. 18, 1962

3,069,676

METHOD OF NARROW BAND TRANSMISSION OF RADAR PANORAMA SCREEN PICTURES

Bernhard Donath, Dorfen (Isen), Germany, assignor to Siemens & Halske Aktiengesellschaft, Berlin and Munich, Germany, a corporation of Germany Filed June 29, 1956, Ser. No. 594,879
Claims priority, application Germany Aug. 2, 1955
6 Claims. (Cl. 343—5)

This invention is concerned with a method of narrow band transmission of radar panorama screen pictures.

Methods have become known for narrow band transmission of radar screen pictures which simplify the pictures to be transmitted by substituting a single signal for all or at any rate for an integral part of all reflected impulses allocated to an aimed object within a scanning time determined by the speed of orbital scanning and the diagram width of the antenna. The transmitted band width is thereby considerably reduced; the limit of reduction being determined by the density in time of the signals to be transmitted, that is, by the required resolving power.

The object of the invention is to accomplish a further reduction of the transmission band width, proceeding thereby from the principle to convert the signals occurring in irregular time sequence into a sequence of signals which is uniformly distributed as to time. For the narrow band transmission of radar panorama screen pictures wherein the screen picture is scanned in a periodic operation in spiral form or line form or star or other screen form, the invention accordingly contemplates a combination of the following features, namely, (*a*) the scanning function of the scanning system following the scanning of each picture point, is suppressed for a predetermined time, for example, for a full scanning period, and after the lapse of such time interval, the scanning beam continues its function following the last scanned picture point; (*b*) the resulting scanning voltages with irregular time sequence are converted into a periodic sequence of voltage values, which contain, for example, by the magnitude of their amplitudes, a criterion for the original time position of the scanning values within the scanning periods; (*c*) this periodic sequence of voltage values, constituting for example an amplitude modulated impulse, is utilized for the transmission, directly or after conversion into a low frequency voltage coure; and (*d*) at the substation, the transmitted signal, for example, the amplitude modulated pulse is used to restore the original allocation of the picture points upon the screen.

It is in this procedure advantageous to employ as a primary screen picture one that has already been simplified. The expression "simplified screen picture" is in this connection intended to mean the combination, in some cases partial, of the reflected impulses at any scanning time, determined by the speed of orbital scanning and the diagram width of the antenna. Such a method is, for example, described in U.S. Patent No. 2,412,669 to A. V. Bedford.

The invention will now be described with reference to the accompanying drawings wherein:

FIG. 1 illustrates schematically, in block form, the primary or transmission steps involved; and FIG. 2 similarly illustrates the secondary or receiving steps involved.

Numeral 1 indicates a two beam storage tube adapted to receive at A the impulses taken from the radar device for registering of the primary radar picture. It is thereby advantageous to use a radar signal which has been simplified in accordance with any of the known processes, that is, one that has been reduced to its net information content. The radar picture is registered upon the storage screen S of the tube 1 in the form of polar coordinates and thus available for further processing.

The storage screen S is for this purpose periodically scanned with the scanning frequency *fr* along orbital paths. The control of the orbital path of the scanning beam is effected by two sine shaped deflecting voltages, phase shifted by 90°, which are generated in a generator 2. The amplitude of these voltages and therewith of the radius of the scanning path is determined in a modulator 3. Furthermore at each orbital motion, there is formed an inpulse in the north marking generator 4. This north marking impulse, after its passage through the scanning stage 5, causes in the stepping voltage generator 14 dimunution of the modulator control voltage always by the width of one line, so that the diameter of the orbital scanning decreases with each revolution by the amount of the longitudinal resolution. The number of north marking impulses is at the same time counted in a meter connected with the stepping voltage generator 14 and, after completion of all revolutions belonging to one complete scanning of the storage, an impulse is on the one hand transmitted to a synchronizing impulse generator 15, and on the other hand the deflection amplitudes belonging to the greatest scanning orbit are adjusted again in a modulator.

The periodic scanning of the stored picture is effected in the described manner provided that there are no reflection impulses present. The scanning course changes however at the instant when the scanning beam of the storage-scanning tube encounters a reflection signal. The scanning amplifier 6 receives at that instant a signal and starts a blocking voltage generator 7 which produces a blocking impulse of rectangular wave shape. Such blocking impulse, on the one hand blocks the scanning current for the length of a full revolution plus the length of a picture element, thereby preventing generation of signals due to reflection signals that might perhaps lie upon the same orbit; and on the other hand blocks in the scanning-out stage 5 the transmission of the north marker to 15, so that the magnitude of the orbital path is not altered. The reflection signal is subsequently inserted into the gap, resulting from the omitted synchronizing impulse, by the mixing stage 13. An impulse is for this purpose formed from the frontal flank of the blocking impulse, in the differentiating stage 8, and such impulse is conducted to the electrical switch 10.

In the sawtooth generator 9, there is formed, from the north marker impulse, a voltage with the frequency *fr* which rises proportional to time. A new impulse is now formed from the sawtooth voltage, by the impulse from the differentiating stage, in the electrical switch 10, the amplitude of the new impulse being a criterion for the time interval between the north marker impulse and the reflection impulse, and therewith a criterion for the azimuth of the reflection. The corresponding voltage value is stored in the impulse storage 11 until arrival of the next north marker impulse.

The stored voltage value is scanned in the north marker scanner 12 at the instant of occurrence of the north marker impulse, and the storage is extinguished by a subsequently generated erase impulse. The impulses produced in this manner, allocated to the reflection signals, are mixed in the mixing stage 13 with the synchronizing signals of the group 15 to form the complete signal.

In case there are several aiming points along one orbital scanning path, the blocking voltage generator will cause corresponding repetition of one and the same scanning paths because only one picture point can be transmitted in each revolution.

At the output of stage 13 therefore appears a signal as follows, namely, first, for each orbital revolution, in the absence of a reflection signal, the north marker impulse in the form of a synchronizing signal is transmitted for the executed alternation; and second, if an operating signal is encountered, a signal impulse is put in place of the synchronizing impulse, and in the following cycles, the part of the orbital path not yet scanned is explored for the presence of further reflection signals. The operation is repeated until all reflections of the orbit are transmitted. The last orbital revolution is not productive of new signals and causes the transmission of a north-synchronizing impulse.

The meter in stage 14 counts the number of the transmitted north impulses, that is, the number of switching operations, and causes responsive to the full number provided for a picture generation of a picture-change signal.

The original polar coordinates for the position of the line in the primary radar picture are transformed in the signal impulse of the output signal as follows, namely, (*a*) the distance of the aiming point is always expressed in the number of north marker impulses between the picture-change signal and the signal impulse; and (*b*) the angular position corresponding at any time to an aiming point is in the illustrated example converted into the amplitude of the signal impulse.

This signal which occurs at the output may advantageously be conducted prior to transmission, over a low pass filter 16 having a limit frequency corresponding, for example, to half the scanning frequency *fr*.

The signal impulses may thereby be distinguished from the synchronizing impulses, for example, in a manner known in television according to which only a predetermined percentage of the maximum amplitude is available for the marking of the angle corresponding at any time to an aiming point, while using the maximum amplitude for the synchronizing impulses.

This manner of control offers the possibility of amplitude-selectively cutting off the synchronizing impulses for use in synchronizing the deflection generator in the substation. This deflection generator effects deflection of the electron beam of the substation synchronous to the deflection beam at the primary station. The deflection signal for the orbital control is obtained in the substation in the same manner as at the primary station. The effective signals are obtained as periodically amplitude modulated impulses by scanning the incoming voltage course with the scanning frequency *fr*. Each effective signal effects a storage so that its voltage value is available for an impulse cycle. Comparison with a sawtooth voltage will then deliver an impulse the spacing of which from the obtained north marker impulse corresponds to the original azimuth angle. This impulse can accordingly be used for brightness scanning of the recording beam of the viewing tube in the substation, thus restoring the original picture.

Thus, referring to FIG. 2, the substation is shown for the case in which the transmission is effected in low frequency position, that is, with the use of a low frequency filter at the output of the primary station. The synchronizing signals which are distinguished by a maximum amplitude, are in the substation separated by an amplitude filter 20. In case the transmission is effected in the form of signal impulses, the reading circuit 28, in the substation, can be omitted, unless it is necessary that the incoming impulses are regenerated in the reading circuit. The synchronizing signal, separated in the amplitude filter 20, synchronizes the generator 22 for producing two deflection voltages which are phase shifted by 90°. The generator 22 for the deflection voltage, modulator 23, north marking generator 24, scanning-out stage 25, and stepping voltage generator 26, of the substation correspond, as indicated in the specification, respectively as to circuitry and functions, exactly to the stages 2, 3, 4, 5 and 14 of the primary station. The deflection voltages which are in the modulator 23 modulated with the stepping voltage from the generator 26, are extended to the picture tube 21. The picture information separated in the amplitude filter 20 is conducted to the readout circuit 28 and is with the aid of the impulse sequence frequency *fr* converted into periodic amplitude modulated impulses. Each signal impulse is in the stage 29 stored for the duration of an impulse period and is compared in a comparison circuit 30 with a sawtooth voltage produced in the stage 27. A new impulse is formed upon coincidence of a momentary value of the sawtooth voltage with the stored signal impulse, the spacing of such new impulse from the north-marking impulse corresponding to the original azimuth angle. The impulses thus obtained are utilized as video signals for the brightness scanning of the recording beam of the reproducing tube 21 in the substation.

It is advantageous for the generation of a voltage course for narrow band transmission, to conduct the periodic sequence of voltage values containing, for example, by the magnitude of the amplitude, a criterion for the original position, as to time, of the scanning values within the scanning period, over a low pass filter with a limit frequency corresponding approximately to half the pulse frequency.

Changes may be made within the scope and spirit of the appended claims.

I claim:

1. A method of narrow band transmission of radar screen pictures from a primary station to a substation, utilizing a periodically deflected beam to scan a screen picture, line for line, said scanning beam being operative to produce, upon interception of a reflected picture element, scanning current impulses, said scanning period being determined by a deflection voltage and the line to line change of the scanning beam being determined by a line-change impulse, comprising the steps of: operatively blocking the scanning function for a full scanning period, including the line-change impulse, upon the interception by the scanning beam of a reflected picture element and thereafter reestablishing the scanning function for continuation on the line being scanned at the time of such interception; thereafter similarly blocking the scanning function for each other reflection element, if any, on such scanning line; thereafter effecting by said line-change impulse, a change to the next line upon completion of such scanning line following interception of any reflected picture elements, thereon; producing a line-change synchronizing impulse for transmission, following completion of each scanning line, from which the receiver line change is to be synchronized; converting each scanning current impulse into an amplitude modulated impulse, the amplitude of which is dependent upon and corresponds to the original time coordinate of the reflected picture element and thus to the resulting scanning impulse; and converting said impulses, originally irregular as to time, into a periodic sequence of impulses for transmission with said synchronizing impulses to a substation for restoration therefrom of the original allocation of the picture elements.

2. A method of narrow band transmission of radar screen pictures from a primary station to a substation, utilizing a periodically deflected beam to scan a screen picture, line for line, said scanning beam being operative to produce, upon interception of a reflected picture element, scanning current impulses, said scanning period being determined by a deflection voltage and the line to line change of the scanning beam being determined by a line-change impulse, comprising the steps of: operatively blocking the scanning function for a full scanning period, including the line-change impulse, upon the interception by the scanning beam of a reflected picture element and thereafter reestablishing the scanning function for continuation on the line being scanned at the time of such interception; thereafter similarly blocking the scanning function for each other reflection element, if any, on such scanning line; thereafter effecting by said line-change impulse, a change to the next line upon completion of such scanning line following interception of any reflected picture elements, thereon; producing a line-change synchronizing impulse for transmission, following completion of each scanning line, from which the receiver line change is to be synchronized; converting each scanning current impulse into an amplitude modulated impulse, the amplitude of which is dependent upon and corresponds to the original time coordinate of the reflected picture elements and thus to the resulting scanning impulse; storing the amplitude modulated impulse until the point in time of normal insertion of the synchronizing impulse and thereupon substituting the stored impulse therefor, whereby the current impulses derived from the scanned picture elements, irregular as to time, are converted into a periodic sequence of amplitude modulated impulses, for transmission with said synchronizing impulses to a substation for restoration therefrom of the original allocation of the picture elements.

3. A method according to claim 2, comprising passing said periodic sequence of impulses through a low pass filter, prior to transmission, to reduce the width of the transmission band.

4. A method according to claim 2, comprising passing said periodic sequence of impulses, prior to transmission, through a low pass filter having a limit frequency corresponding approximately to half the pulse frequency, to reduce the width of the transmission band.

5. A method according to claim 4, comprising producing a sawtooth voltage which increases, time-proportionally with the scanning frequency, synchronizing said sawtooth voltage with the line-change impulses, and forming said amplitude modulated element impulses therefrom.

6. A method according to claim 5, comprising transmitting the synchronizing impulses with an amplitude greater than the maximum amplitude of impulses representing reflected picture elements, and effecting separation in the substation of the synchronizing impulses from the element impulses by amplitude selection.

No references cited.